(12) United States Patent
Kawabata

(10) Patent No.: US 8,246,455 B2
(45) Date of Patent: Aug. 21, 2012

(54) VIDEO GAME WITH PLAYER DIRECTED DISCRETE AND FREE CAMERA MODES

(75) Inventor: Yasuhiro Kawabata, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1213 days.

(21) Appl. No.: 12/064,736

(22) PCT Filed: Mar. 29, 2006

(86) PCT No.: PCT/JP2006/306504
§ 371 (c)(1),
(2), (4) Date: Feb. 25, 2008

(87) PCT Pub. No.: WO2007/023592
PCT Pub. Date: Mar. 1, 2007

(65) Prior Publication Data
US 2009/0131167 A1     May 21, 2009

(30) Foreign Application Priority Data

Aug. 26, 2005    (JP) ................................ 2005-246303

(51) Int. Cl.
*A63F 13/00* (2006.01)
(52) U.S. Cl. ............................................ 463/32; 463/33
(58) Field of Classification Search .................... 463/32, 463/33
See application file for complete search history.

(56) References Cited

U.S. PATENT DOCUMENTS 6,155,926 A    12/2000    Miyamoto
6,417,856 B1    7/2002    Tamura
6,612,930 B2 *    9/2003    Kawagoe et al. ............... 463/33

(Continued)

FOREIGN PATENT DOCUMENTS

JP      07-116343 A      5/1995

(Continued)

OTHER PUBLICATIONS

"Wikipedia warzone 2100". From Wikipedia, The Free Encylopedia. [online], [retrieved on Sep. 8, 2011]. Retrieved from the Internet <URL:http://en.wikipedia.org/wiki/Warzone_2100>. 6 pages.*

(Continued)

*Primary Examiner* — Melba Bumgarner
*Assistant Examiner* — Lawrence Galka
(74) *Attorney, Agent, or Firm* — Sughrue Mion, PLLC

(57) ABSTRACT

A game machine includes a first virtual camera control unit which determines a change direction in which a posture of the virtual camera is changed, based on a state of operation of an operation unit, and changes a posture of the virtual camera such that the virtual camera is directed in a direction displaced from a current direction in the change direction by a predetermined angle; a second virtual camera control unit which determines a direction in the virtual three dimensional space based on the state of operation of the operation unit, and changes the posture of the virtual camera such that the virtual camera is directed in the determined direction; and a virtual camera control switching unit which switches between a state in which the first virtual camera control unit controls the virtual camera and a state in which the second virtual camera control unit controls the virtual camera.

9 Claims, 13 Drawing Sheets

U.S. PATENT DOCUMENTS

| | | | |
|---|---|---|---|
| 6,626,760 B1 * | 9/2003 | Miyamoto et al. | 463/33 |
| 7,470,195 B1 * | 12/2008 | Baldwin et al. | 463/33 |
| 7,485,041 B2 * | 2/2009 | Katsuragawa et al. | 463/34 |
| 7,545,374 B2 * | 6/2009 | Akada et al. | 345/427 |
| 7,744,465 B2 * | 6/2010 | Suzuki et al. | 463/32 |
| 2002/0018065 A1 | 2/2002 | Tobita et al. | |
| 2002/0115486 A1 * | 8/2002 | Miyamoto et al. | 463/32 |

FOREIGN PATENT DOCUMENTS

| | | |
|---|---|---|
| JP | 2000-245955 A | 9/2000 |
| JP | 001046736 A | 2/2001 |
| JP | 2001-195608 A | 7/2001 |
| JP | 2002-024860 A | 1/2002 |
| JP | 2002-243485 A | 8/2002 |
| JP | 2005-176933 A | 7/2005 |

OTHER PUBLICATIONS

"Warzone 2100 Guide: Basics-Controlling the Camera". [online], [retrieved Sep. 8, 2011]. Retrieved from the Internet <URL:http://guide.wz2100.net/camera>. 2 pages.*

European Search Report dated Aug. 5, 2008.

Japanese Office Action dated Jul. 1, 2008.

International Preliminary Report on Patentability.

"AutoCAD de 3 Jigen o Hajimeyo Kisohen", Gekkan CAD & CG magajin, Aug. 1, 2003, pp. 56 to 63, vol. 5, No. 8, X-Knowledge Co., Ltd.

* cited by examiner

FIG.2
(a)
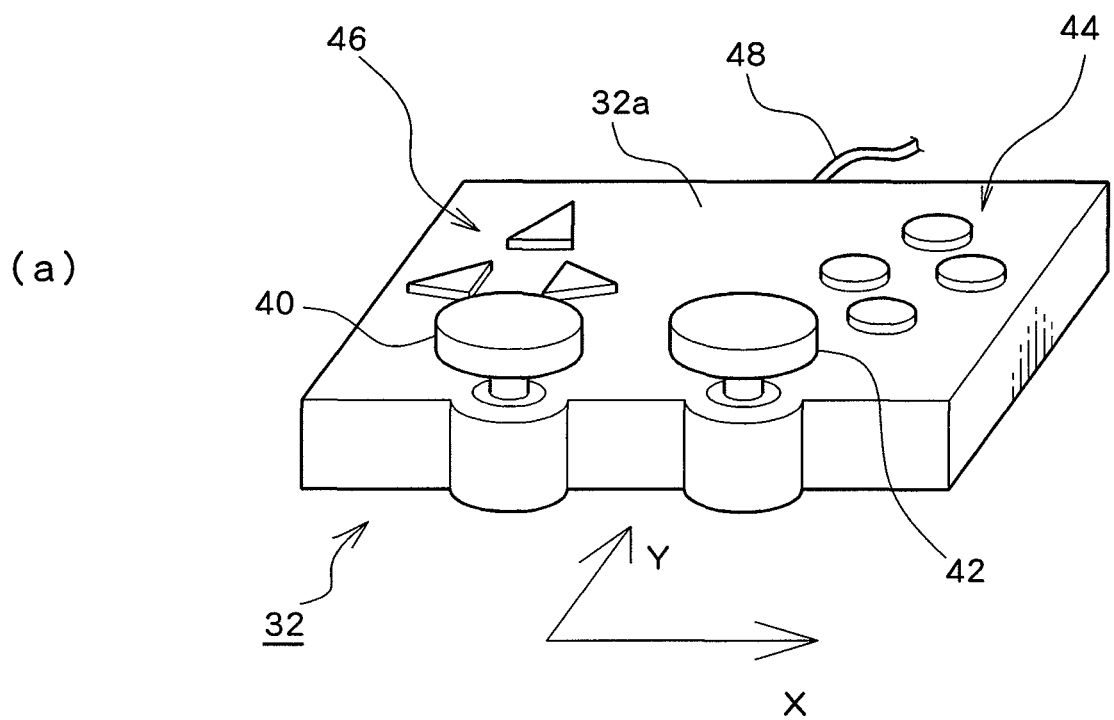
(b)
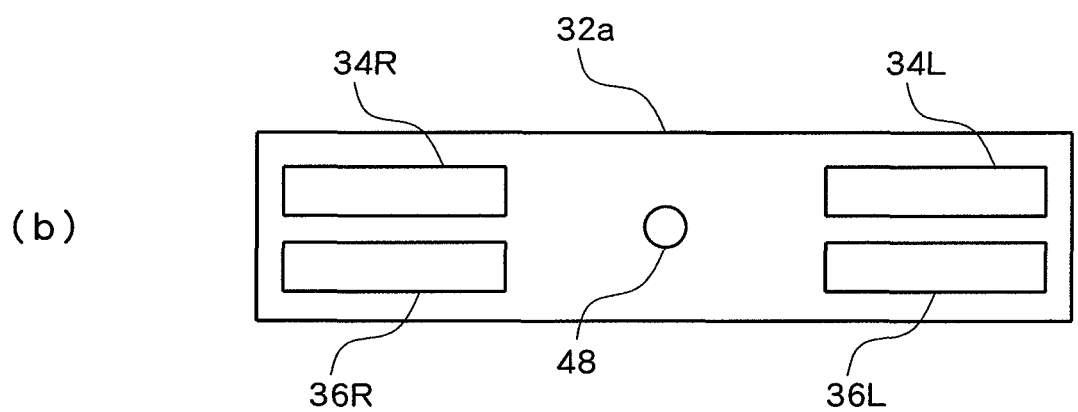

| AREA ID | DIRECTION |
|---|---|
| 1 | NORTH |
| 2 | NORTHEAST |
| 3 | EAST |
| 4 | SOUTHEAST |
| 5 | SOUTH |
| 6 | SOUTHWEST |
| 7 | WEST |
| 8 | NORTHWEST |

S7 > S1 = S2 = S3 = S4 = S5 = S6 = S8

VIDEO GAME WITH PLAYER DIRECTED DISCRETE AND FREE CAMERA MODES

TECHNICAL FIELD

The present invention relates to a game machine, a control method of the game machine, and an information storage medium.

BACKGROUND ART

There is known a game machine in which a virtual camera is installed in a virtual three dimension space and a picture obtained by viewing the virtual three dimension space from the virtual camera is displayed as a game image. In such a game machine, generally, the game player can change the position and/or posture of the virtual camera by operating a direction key, an operation stick, and so forth, for example.
Patent Document 1: Japanese Patent Laid-open Publication No. Hei 7-116343

DISCLOSURE OF THE INVENTION

Problem to be Solved by the Invention

However, in the above-described game machine, it is often the case that the game player loses an idea about in which direction the virtual camera is directed in the virtual three dimension space and the game player thus cannot readily set the virtual camera in their desired orientation.

The present invention has been conceived in view of the above, and aims to produce a game machine, a control method of the game machine, and an information storage medium for enabling the game player to set, through a simple operation, the virtual camera directed in their desired direction in the virtual three dimension space.

Means for Solving the Problem

In order to attain the above-described object, according to one aspect of the present invention, there is provided a game machine for showing a picture obtained by viewing a virtual three dimensional space from a virtual camera placed in the virtual three dimensional space, comprising first virtual camera control means for determining a change direction in which a posture of the virtual camera is changed, based on a state of operation of operation means, and changing the posture of the virtual camera such that the virtual camera is directed in a direction displaced from a current direction in the change direction by a predetermined angle; second virtual camera control means for determining a direction in the virtual three dimensional space based on the state of operation of the operation means, and changing the posture of the virtual camera such that the virtual camera is directed in the determined direction; and virtual camera control switching means for switching states, according to a predetermined switching operation, between a state in which the first virtual camera control means controls the virtual camera and a state in which the second virtual camera control means controls the virtual camera.

According to another aspect of the present invention, there is provided a control method of a game machine for showing a picture obtained by viewing a virtual three dimensional space from a virtual camera placed in the virtual three dimensional space, comprising a first virtual camera control step of determining a change direction in which a posture of the virtual camera is changed, based on a state of operation of operation means, and changing the posture of the virtual camera such that the virtual camera is directed in a direction displaced from a current direction in the change direction by a predetermined angle; a second virtual camera control step of determining a direction in the virtual three dimensional space based on the state of operation of the operation means, and changing the posture of the virtual camera such that the virtual camera is directed in the determined direction; and a virtual camera control switching step of switching states, according to a predetermined switching operation, between a state in which the virtual camera is controlled at the first virtual camera control step and a state in which the virtual camera is controlled at the second virtual camera control step.

According to still another aspect of the present invention, there is provided a program for causing a computer, such as a consumer game machine, a commercial game machine, a portable game machine, a portable phone, a personal computer, a server computer, or the like, to function as a game machine for showing a picture obtained by viewing a virtual three dimensional space from a virtual camera placed in the virtual three dimensional space, the computer functioning as first virtual camera control means for determining a change direction in which a posture of the virtual camera is changed, based on a state of operation of operation means, and changing the posture of the virtual camera such that the virtual camera is directed in a direction displaced from a current direction in the change direction by a predetermined angle; second virtual camera control means for determining a direction in the virtual three dimensional space based on the state of operation of the operation means, and changing the posture of the virtual camera such that the virtual camera is directed in the determined direction; and virtual camera control switching means for switching states, according to a predetermined switching operation, between a state in which the first virtual camera control means controls the virtual camera and a state in which the second virtual camera control means controls the virtual camera.

According to yet another aspect of the present invention, there is provided a computer readable information storage medium storing the above-described program. According to yet another aspect of the present invention, there is provided a program distribution device having an information storage medium storing the above-described program, for reading the program from the above-described information storage medium and distributing the program read. According to yet another aspect of the present invention, there is provided a program distribution method which uses a computer readable information storage medium storing the above-described program, for reading the program from the above-described information storage medium and distributing the program read.

The present invention relates to a game machine for showing a picture obtained by viewing a virtual three dimensional space from a virtual camera placed in the virtual three dimensional space. According to the present invention, a change direction in which the posture of the virtual camera is changed is determined based on the state of operation of operation means, and the posture of the virtual camera is changed such that the virtual camera is directed in a direction displaced from a current direction in the change direction by a predetermined angle (a first virtual camera control state). Also, according to the present invention, a direction in the virtual three dimensional space is determined based on the state of operation of the operation means, and the posture of the virtual camera is changed such that the virtual camera is directed in the determined direction (a second virtual camera control state). Then, the first virtual camera control state and the second virtual camera control state are switched according to a predetermined switching operation. That is, according to the present invention, the game player can arrange, through a relatively easy operation, the virtual camera directed in their desired direction in the virtual three dimensional space.

In one embodiment of the present invention, the first virtual camera control means may include means for storing posture specification information in storage means when the virtual camera control switching means switches the state in which the first virtual camera control means controls the virtual camera to the state in which the second virtual camera control means controls the virtual camera, the posture specification information specifying the posture of the virtual camera at that time; and means for setting the posture of the virtual camera based on the posture specification information stored in the storage means when the virtual camera control switching means switches the state in which the second virtual camera control means controls the virtual camera to the state in which the first virtual camera control means controls the virtual camera. This arrangement makes it possible for the game player, when the state in which the second virtual camera control means controls the virtual camera is switched to the state in which the first virtual camera control means controls the virtual camera, to promptly start the game under such a condition.

In one embodiment of the present invention, the second virtual camera control means may include means for storing direction history-related information concerning a history of directions in which the virtual camera has been set directed by the second virtual camera control means, and means for determining the direction in the virtual three dimensional space based on the direction history-related information in response to a predetermined operation, and changing the posture of the virtual camera such that the virtual camera is directed in that direction. This arrangement makes it possible to reduce the labor of the game player attempting to direct the virtual camera into "the direction in which the virtual camera has been directed by the second virtual camera control means".

In one embodiment of the present invention, the game machine may further comprise operation value acquisition means for acquiring an operation value in accordance with the state of operation of the operation means, wherein the second virtual camera control means may include means for storing any of a plurality of directions in the virtual three dimensional space, so as to correspond to a respective range of a plurality of operation value ranges which do not overlap, and determination means for determining whether or not the operation value acquired by the operation value acquisition means is contained in any of the plurality of operation value ranges, and changing the posture of the virtual camera, when it is determined that the operation value acquired by the operation value acquisition means is contained in any of the plurality of operation value ranges, such that the virtual camera is directed in a direction corresponding to that operation value range and the determination means may change the plurality of operation value ranges, when it is determined that the operation value acquired by the operation value acquisition means is contained in any of the plurality of operation value ranges, such that that operation value range is expanded and other operation value ranges are narrowed, and determine whether or not the operation value acquired by the operation value acquisition means is contained in any of the plurality of operation value ranges, based on the plurality of operation value ranges after change. This arrangement can suppress deficiency due to frequent change of the posture of the virtual camera, which tends to be caused when the operation value according to the state of operation of the operation means is changed in the vicinity of the boundary between the operation value ranges.

In one embodiment of the present invention, the first virtual camera control means may determine a change direction in which a posture of the virtual camera is changed, based on an inclination direction of an operation stick included in the operation means, and change the posture of the virtual camera such that the virtual camera is directed in a direction displaced from a current direction in the change direction by a predetermined angle, the second virtual camera control means may determine a direction in the virtual three dimensional space based on the inclination direction of the operation stick, and changes the posture of the virtual camera such that the virtual camera is directed in the determined direction, and the predetermined switching operation may be an operation to press the operation stick in an axial direction. This arrangement makes it possible to preferably carry out an operation to change the posture of the virtual camera and the above-described predetermined switching operation, using a single operating member.

BRIEF DESCRIPTION OF THE DRAWINGS

FIG. 2 is a diagram showing one example of a controller;

FIG. 6 is a diagram showing data representative of the correspondence between the posture of the right operation stick and a direction in the virtual three dimensional space;

BEST MODE FOR CARRYING OUT THE INVENTION

In the following, one example of an embodiment of the present invention will be described in detail with reference to the accompanying drawings.

Figure 1:
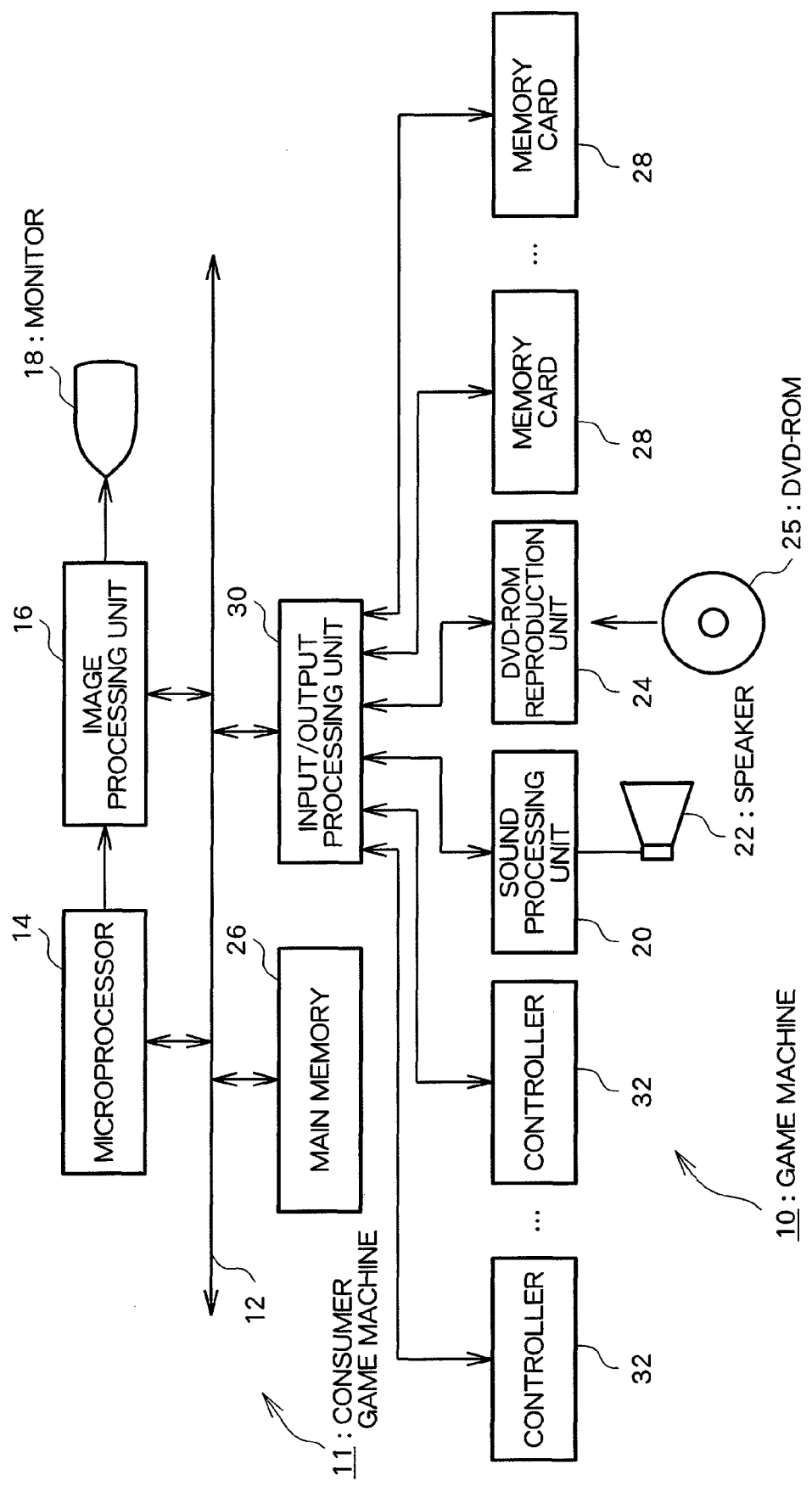
FIG. 1 is a diagram showing a hardware structure of a game machine according to this embodiment.

FIG. 1 is a diagram showing a hardware structure of a game machine according to the embodiment of the present invention. The shown game machine 10 comprises a consumer game machine 11 having a DVD-ROM 25 and a memory card 28, or information storage media, mounted thereto, and a monitor 18 and a speaker 22 connected thereto. For example, the monitor 18 may be a home-use television set receiver, and the speaker 22 may be a built-in speaker thereof.

The consumer game machine 11 is a publicly known computer game system comprising a bus 12, a microprocessor 14, an image processing unit 16, a sound processing unit 20, a DVD-ROM reproduction unit 24, a main memory 26, an input/output processing unit 30, and a controller 32. The respective structural elements other than the controller 32 are accommodated in an enclosure.

The bus 12 is used for exchanging addresses and/or data among the respective units of the consumer game machine 11. The microprocessor 14, the image processing unit 16, the main memory 26, and the input/output processing unit 30 are mutually connected via the bus 12 for data communication.

The microprocessor 14 controls the respective units of the consumer game machine 11 based on an operation system stored in a ROM (not shown), a program read from the DVD-ROM 25, and data read from the memory card 28. The main memory 26 comprises a RAM, for example, into which a program read from the DVD-ROM 25 and/or data read from the memory card 28 is written when necessity. The main memory 26 is used also as a working memory of the microprocessor 14.

The image processing unit 16, which comprises a VRAM, renders a game screen image into the VRAM based on the image data received from the microprocessor 14, converts the content of the rendered game screen image into a video signal, and outputs the video signal to the monitor 18 at a predetermined timing.

The input/output processing unit 30 is an interface via which the microprocessor 14 accesses the sound processing unit 20, the DVD-ROM reproduction unit 24, the memory card 28, and the controller 32. The sound processing unit 20, the DVD-ROM reproduction unit 24, the memory card 28, and the controller 32 are connected to the input/output processing unit 30.

The sound processing unit 20 comprises a sound buffer, reproduces various sound data, such as game music, game sound effects, messages, and so forth, read from the DVD-ROM 25 and stored in the sound buffer, and outputs via the speaker 22.

The DVD-ROM reproduction unit 24 reads a program from the DVD-ROM 25 according to an instruction from the microprocessor 14. It should be noted that although the DVD-ROM 25 is used here to provide a program to the consumer game machine 11, any other information storage media, such as a CD-ROM, a ROM card, or the like, may be used. Alternatively, the program may be provided via a data communication network, such as the Internet, or the like, from a remote place to the consumer game machine 11.

The memory card 28 comprises a nonvolatile memory (for example, EEPROM, or the like). The consumer game machine 11 has a plurality of memory card slots defined therein each for accepting a memory card 28, so that a plurality of memory cards 28 can be inserted into the consumer game machine 11 at the same time. The memory card 28 is removal relative to the slot, and stores various game data, such as saved data, or the like.

The controller 32 is a general purpose operation input means via which the game player inputs various game operations. The input/output processing unit 30 scans the states of the respective units of the controller 32 in a constant cycle (for example, every 1/60 seconds), and sends an operation signal about the scanning result to the microprocessor 14 via the bus 12. The microprocessor 14 determines the game operation carried out by the game player, based on the operation signal.

The consumer game machine 11 is adapted to connection to a plurality of controllers 32, and the microprocessor 14 controls a game based on the operation signals input from the respective controllers 32.

FIG. 2 shows one example of the controller 32. As shown in FIG. 2(a), the controller 32 has direction buttons 46 and a left operation stick 40 on the left side of the front surface 32a, and buttons 44 and a right operation stick 42 on the right side of the front surface 32a, and is connected to the consumer game machine 11 via a controller cable 48. As shown in FIG. 2(b), the controller 32 has the buttons 34L, 34R provided on the left and right sides, respectively, of the lateral surface closer to the front surface 32a, and the buttons 36L, 36R, similarly provided but closer to the rear surface. Further, it is arranged such that the game player's left thumb is placed on the direction buttons 46 and the left operation stick 40 when the game player grasps the enclosure of the controller 32 on the right and left ends thereof with both their hands, that their right thumb is placed on the buttons 44 and the right operation stick 42, that at least one of their right index and middle fingers is placed on the buttons 34R, 36R, and at least one of their left index and middle fingers is placed on the buttons 34L, 36L.

The direction buttons 46, the buttons 44, and the buttons 34L, 34R, 36L, 36R are formed as pressure sensitive buttons, each having a pressure sensor. With these buttons pressed by the game player, 256-steps of digital values having 0 to 255 values are input to the consumer game machine 11 according to the pressure force. The consumer game machine 11 can determine based on the digital value, for example, that the button is not pressed in response to the digital value 0 input from the controller 32, and that the button is pressed with a maximum pressure force in response to the digital value 255 input.

The left operation stick 40 and the right operation stick 42 are stick-like operating members upstanding on the front surface of the enclosure of the controller 32, and adapted to be able to incline from the upright state in all directions at a predetermined angle. As shown in FIG. 2(a), with the longitudinal direction of the enclosure of the controller 32 defined as the X axial direction (the right direction defined as the positive direction in FIG. 2(a)), and the depth direction thereof, that is, perpendicular to the X axial direction, defined as the Y axial direction (a direction extending closer to farther with respect to the reader of the specification in FIG. 2(a), defined as the positive direction), the posture (the state of operation) of the left operation stick 40 is input as inclination in either the x or Y axial direction (posture data (X, Y)) in the form of a digital value in the range between −127 and +128 into the consumer game machine 11. Specifically, X=0 represents the left operation stick 40 not inclined in the X axial direction; X=+128 represents the left operation stick 40 inclined to the limit of the positive direction of the X axis (in the right direction in FIG. 2(a)); and X=−127 represents the left operation stick 40 inclined to the limit of the negative direction of the X axis (the left direction in FIG. 2(a)). This description is similarly applied to the Y axial direction. Also, this description about the right operation stick 42 is similarly applied to the left operation stick 40. In the consumer game machine 11, the current inclination state (posture) of the left operation stick 40 and the right operation stick 42 can be known as described above. The left operation stick 40 and the right operation stick 42 are each formed as a pressure sensitive button similar to the direction buttons 46, the buttons 44, and so forth, and adapted to be pressed in the axial direction of the stick.

Figure 3:
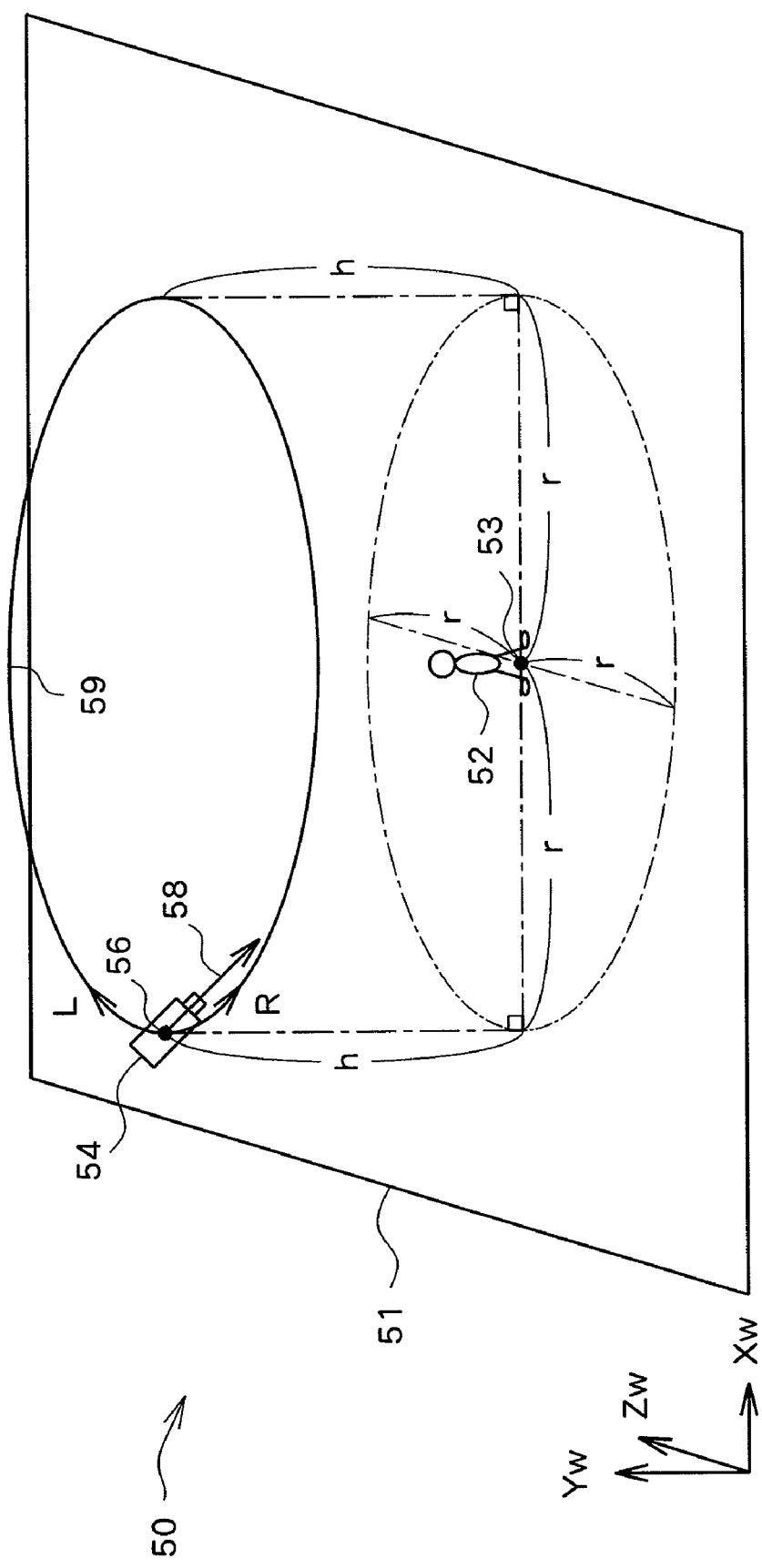
FIG. 3 is a perspective view showing one example of a virtual three dimensional space.

In the game machine 10 having the above-described hardware structure, a virtual three dimensional space (a three dimensional game space) is created in the main memory 26. FIG. 3 is a diagram schematically showing the three dimensional space. As shown in FIG. 3, a field object 51, parallel to the Xw-Zw plane, is placed in the virtual three dimensional space 50, and the player object 52 is placed on the field object 51. The player object 52 is an object to be controlled by the game player, and changes the position and posture thereof according to an operation signal input from the controller 32. In this embodiment, the player object 52 moves according to the content of the game player's operation carried out relative to the direction buttons 46 and/or the left operation stick 40. When the game player operates the buttons 44, the player object 52 behaves according to the content of the operation. It should be noted that although objects other than the player object 52 are actually placed in the virtual three dimensional space 50, these objects are not shown in FIG. 3.

A virtual camera 54 is placed in the virtual three dimensional space 50, so that a picture obtained by viewing the virtual three dimensional space 50 from the virtual camera 54 is shown on the monitor 18. That is, the picture obtained by viewing from the viewpoint position 56 in the sight line direction vector 58 is shown on the monitor 18. In this embodiment, the virtual camera 54 is placed on the camera trajectory 59 at the "distance (distance on the Xw-Zw plane) from the reference position 53 that is a predetermined distance r and the height from the field object 51 that is a predetermined distance h". Here, the reference position 53 is determined based on the position of the player object 52, which is, for example, the position of the feet of the player object 52.

In this embodiment, the position and posture of the virtual camera 54 can be changed in response to the game player's operation carried out relative to the right operation stick 42. In this embodiment, a normal operation mode and a direction designation operation mode are available as an operation mode with the virtual camera 54. The direction designation operation mode is effective while the right operation stick 42 is kept pressed in the axial direction, and the normal operation mode is effective during other periods of time.

In the following, a normal operation mode will first be described. In the normal operation mode, in response to the right operation stick 42 inclined rightward or leftward, the virtual camera 54 (the viewpoint position 56) moves along the camera trajectory 59. For example, with the right operation stick 42 inclined rightward (the X axis positive direction in FIG. 2(a)), the virtual camera 54 moves along the camera trajectory 59 in the right direction of the virtual camera 54 (the R direction in FIG. 3). Also, with the right operation stick 42 inclined leftward (the X axis negative direction in FIG. 2(a)), the virtual camera 54 moves along the camera trajectory 59 in the left direction of the virtual camera 54 (the L direction in FIG. 3). In this case, the virtual camera 54 changes the posture (a sight line direction vector 58, for example) thereof, following the change in position thereof (the viewpoint position 56), such that the sight line direction vector 58 coincides with the direction vector extending from the viewpoint position 56 to a predetermined watched position (a reference position 53, for example).

Figure 4:
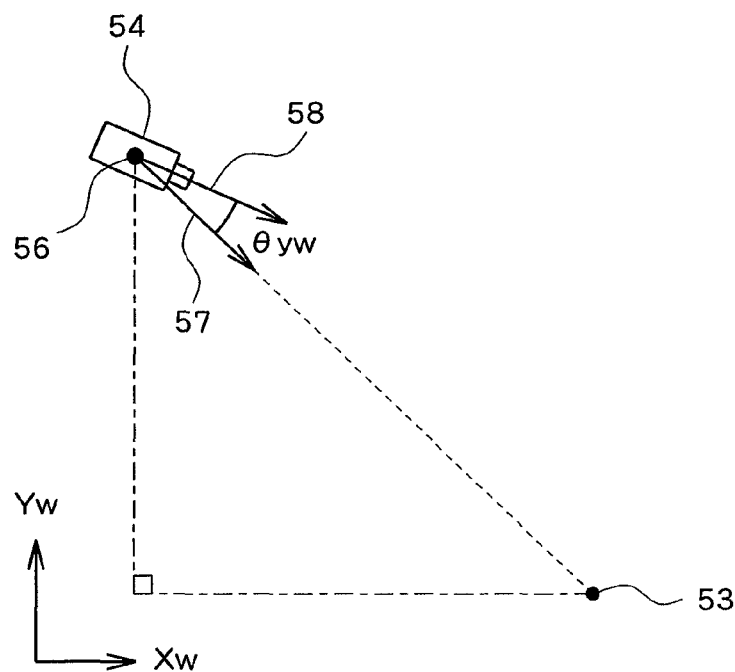
FIG. 4 is a diagram concerning rotation of a sight line direction vector in the Yw axial direction.

In the normal operation mode, with the right operation stick 42 inclined upward or downward, the sight line direction vector 58 rotates in the positive or negative direction relative of the Yw axis with the viewpoint position 56 as a center. For example, with the right operation stick 42 inclined upward (the Y axis positive direction in FIG. 2(a)), the sight line direction vector 58 rotates in the positive direction of the Yw axis with the viewpoint position 56 as a center, as shown in FIG. 4. Similarly, with the right operation stick 42 inclined downward (the Y axis negative direction in FIG. 2(a)), the sight line direction vector 58 rotates in the negative direction of the Yw axis with the viewpoint position 56 as a center. In this case, the sight line direction vector 58 is prevented from rotating in either the positive or negative direction of the Yw axis by an extent exceeding a predetermined angle.

In the following, a direction vector extending from the viewpoint position 56 to the reference position 53 is defined as a reference sight line direction vector 57, and the angle between the sight line direction vector 58 and the reference sight line direction vector 57 is defined as an up/down angle θyw. For example, when the right operation stick 42 is inclined upward with the sight line direction vector 58 coincident with the reference sight line direction vector 57 and the sight line direction vector 58 is thereby rotated by ten degrees in the positive direction of the Yw axis with the viewpoint position 56 as a center, the up/down angle θyw "+10 degrees" results. Also, for example, when the right operation stick 42 is inclined downward with the sight line direction vector 58 coincident with the reference sight line direction vector 57 and the sight line direction vector 58 is thereby rotated by ten degrees in the negative direction of the Yw axis with the viewpoint position 56 as a center, the up/down angle θyw "−10 degrees" results.

In the following, a direction designation operation mode will be described. In the direction designation operation mode, the position and posture of the virtual camera 54 is updated such that the virtual camera 54 is directed in the direction corresponding to the posture data input from the right operation stick 42, in the virtual three dimensional space 50.

Figure 5:
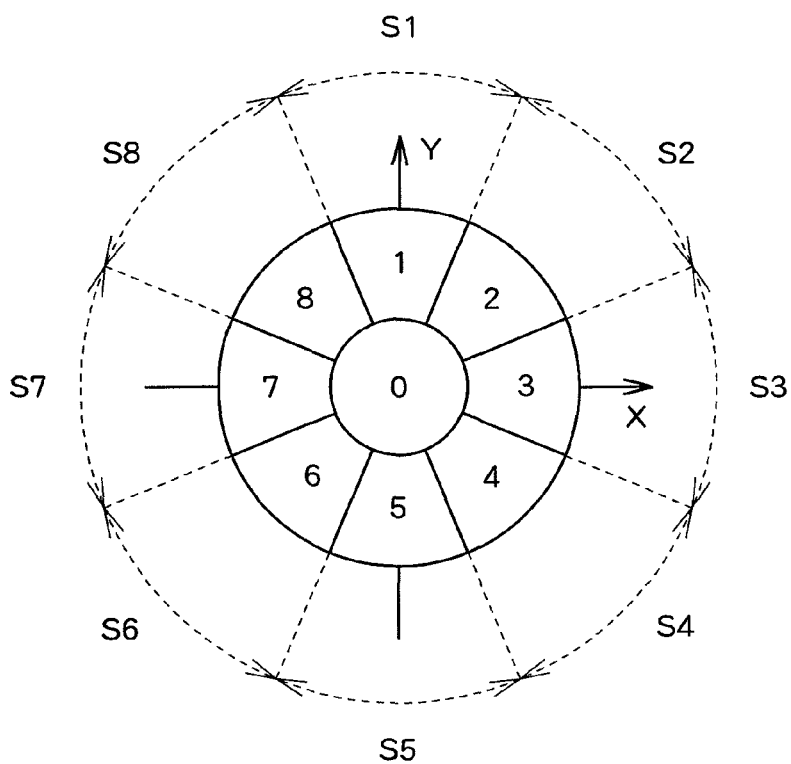
FIG. 5 is a diagram showing a posture determination criterion of a right operation stick.

FIG. 5 is a diagram showing a criterion for use in determination (a determination criterion) as to posture data input using the right operation stick 42. FIG. 6 is a diagram showing correspondence between the determination result about the posture data input using the right operation stick 42 and the direction in the virtual three dimensional space 50.

As shown in FIG. 5, the posture data input from the right operation stick 42 is classified into nine posture states. That is, when the posture data (X, Y) is input using the right operation stick 42, determination is made to find which of the areas "0" to "8" on the XY plane, shown in FIG. 5, the input data indicates. Here, the area "0" is a circular area defined on the XY plane, having a predetermined radius with the origin as the center, and corresponds to the right operation stick 42 in an upstanding state. The areas from "1" to "8" have the same size.

The area "1" is a 45 degree fan-like area expanding in the 0 degree direction (with the Y axial direction defined as 0 degrees, clock rotation is defined as a positive direction, which is similarly applied in the following) on the XY plane excluding the area "0", and corresponds to the right operation stick 42 inclined in the 0 degree direction. The "2" area is a 45 degree fan-like area expanding in the 45 degree direction on the XY plane excluding the area "0", and corresponds to the right operation stick 42 inclined in the 45 degree direction. The "3" area is a 45 degree fan-like area expanding in the 90 degree direction on the XY plane excluding the area "0", and corresponds to the right operation stick 42 inclined in the 90 degree direction. The "4" area is a 45 degree fan-like area expanding in the 135 degree direction on the XY plane excluding the area "0", and corresponds to the right operation stick 42 inclined in the 135 degree direction. The "5" area is a 45 degree fan-like area expanding in the 180 degree direction on the XY plane excluding the area "0", and corresponds to the right operation stick 42 inclined in the 180 degree direction. The "6" area is a 45 degree fan-like area expanding in the 225 degree direction on the XY plane excluding the area "0", and corresponds to the right operation stick 42 inclined in the 225 degree direction. The "7" area is a 45 degree fan-like area expanding in the 270 degree direction on the XY plane excluding the area "0", and corresponds to the right operation stick 42 inclined in the 270 degree direction. The "8" area is a 45 degree fan-like area expanding in the 315 degree direction on the XY plane excluding the area "0", and corresponds to the right operation stick 42 inclined in the 315 degree direction. In the following, the state in which the posture data input using the right operation stick 42 is located in the "n" area on the XY plane is referred to as an "n" state.

As shown in FIG. 6, the respective directions "north", "northeast", "east", "southeast", "south", "southwest", "west", "northwest" in the virtual three dimensional space 50 are assigned to the respective areas "1" to "8". It should be noted that, in this embodiment, the positive direction of the Zw axis is defined as "north", and the positive direction of the Xw axis is defined as "east".

Figure 7:
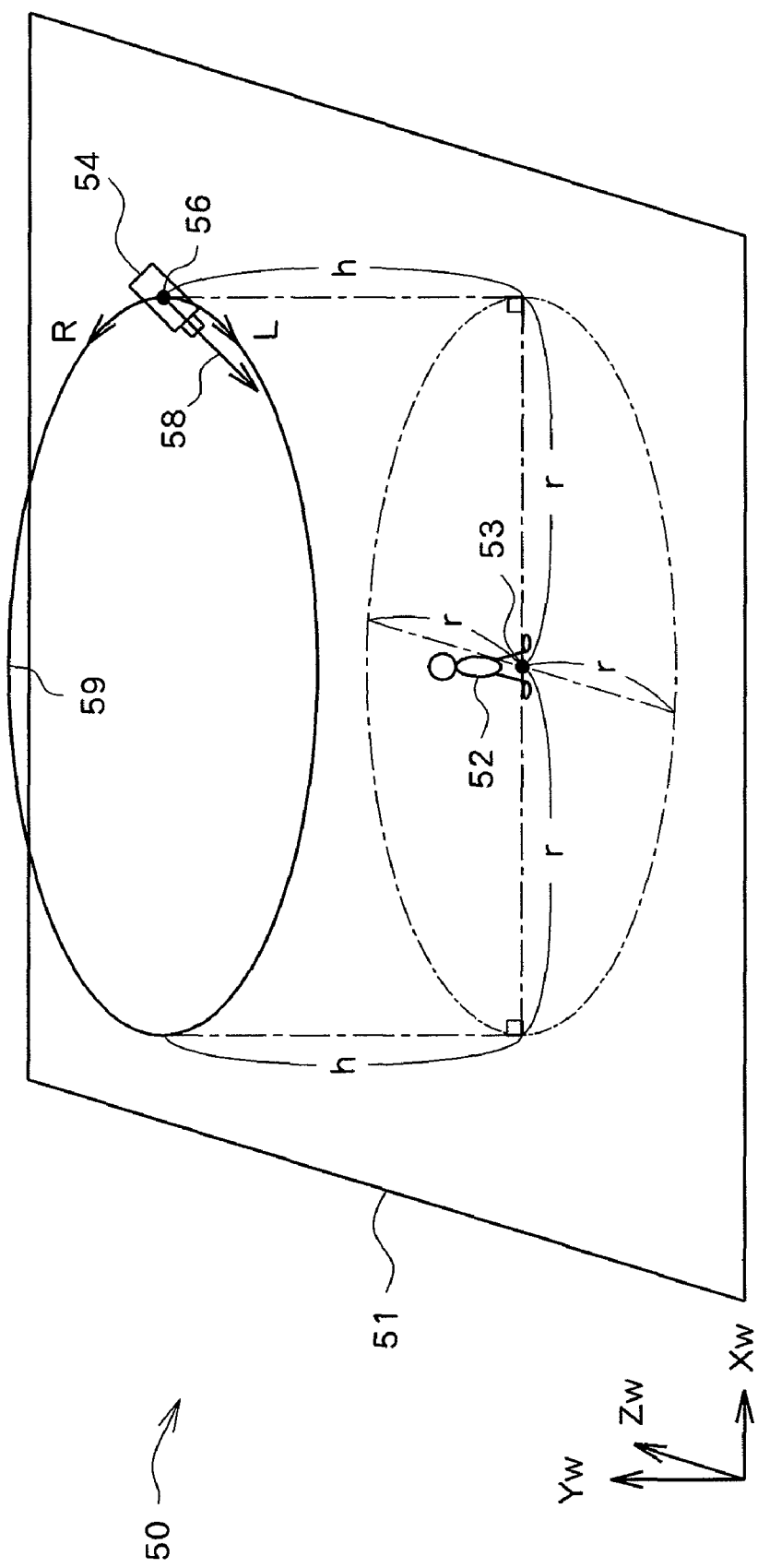
FIG. 7 is a perspective view showing one example of a virtual three dimensional space.

For example, it is arranged such that in response to the game player operating the right operation stick 42 to incline in the 270 degree direction, the virtual camera 54 is set so as to be directed to the "west" (FIG. 7). That is, the viewpoint position 56 is changed to "a position on the camera trajectory 59, 'east' of the reference position 53". The sight line direction vector 58 is changed so as to coincide with "a vector formed by rotating, with the viewpoint position 56 as the center, the direction vector extending from the viewpoint position 56 to the reference position 53 in the Yw axial direction by an up/down angle Oyw set in the normal operation mode".

As described above, it is possible for the game player to instruct through a relatively easy operation in the direction designation operation mode that the virtual camera 54 should be directed in their desired direction.

Figure 8:
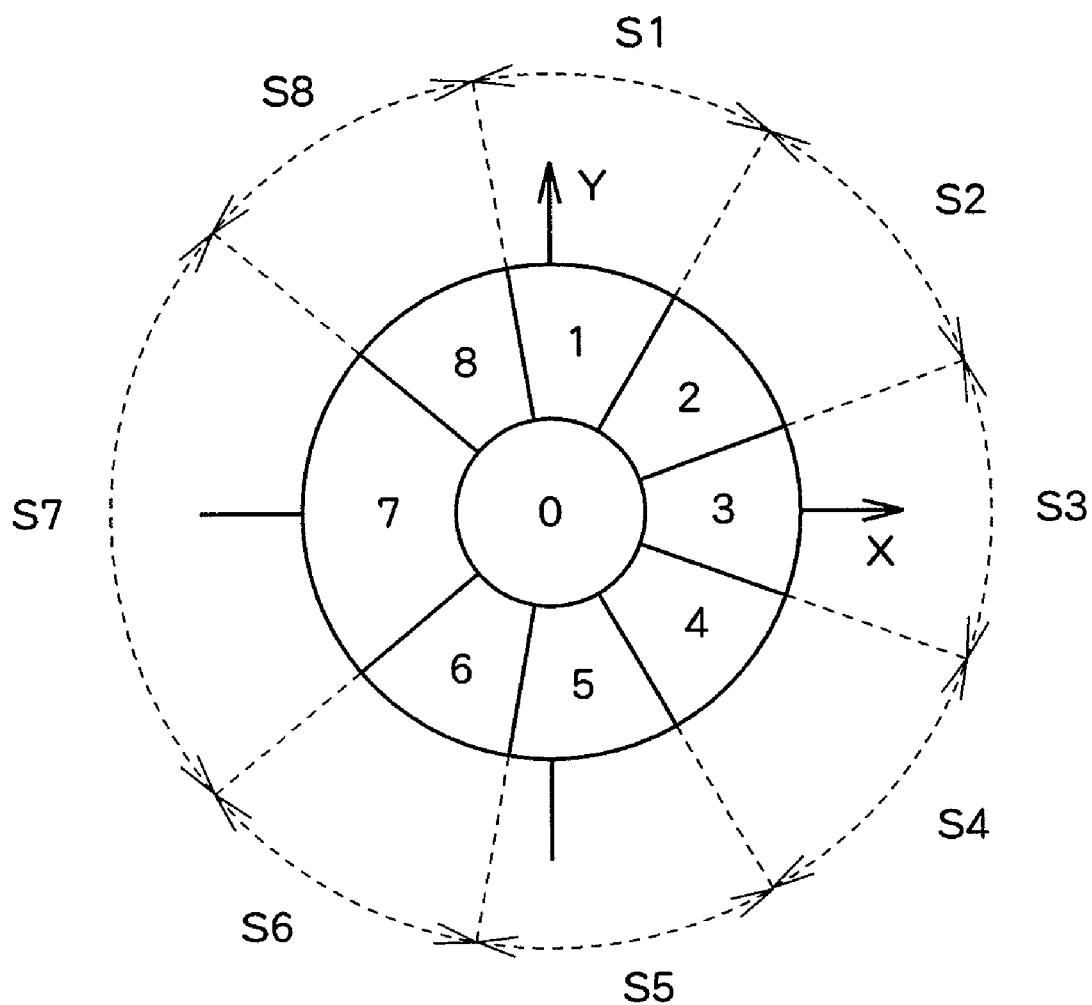
FIG. 8 is a diagram showing a posture determination criterion of the right operation stick.

It should be noted that in the state with the right operation stick 42 inclined in a certain direction, the determination criterion for the posture data input using the right operation stick 42 is changed. Specifically, the area corresponding to the posture state of the right operation stick 42 becomes larger, while the other areas become smaller. FIG. 8 shows the determination criterion with the right operation stick 42 inclined in the 270 degree direction (the posture data input using the right operation stick 42, contained in the area "7"). As shown in FIG. 8, the area "7" is larger than the other areas "1" to "6", "8", all having the same size. Specifically, the "7" area, corresponding to the posture state of the right operation stick 42, is the fan-like area of 45+(Δθ×2) degrees expanding in the 270 degree direction on the XY plane, excluding the area "0". The areas other than the areas "7" and "0" are fan-like areas of 45−((Δθ×2)/7) degrees excluding the area "0". When the right operation stick 42 is inclined such that the posture data input using the right operation stick 42 indicates than area other than the areas "0" and "7" in the above, the virtual camera 54 is set so as to be directed in the direction corresponding to that area.

When the posture data input using the right operation stick 42 is changed in the vicinity of the border between the areas, the position and posture of the virtual camera 54 tend to change frequently, which is problematic. Such a situation can be pevented from occurring in the direction designation operation mode by the above-described arrangement.

In the direction designation operation mode, the history of the directions having been designated by the game player thus far is stored. Then, with the right operation stick 42 kept in the upstanding state for a predetermined period of time (T1), the virtual camera 54 is directed in the direction that was last designated. With the right operation stick 42 kept in the upstanding state for another predetermined period of time (T2), the virtual camera 54 is directed in the direction designated the last time but one. Thereafter, every time the right operation stick 42 continues to remain in the upstanding state for a predetermined period of time (T2), the virtual camera 54 is directed in the previously designated, by one, direction. Here, the times T1 and T2 may or may not be identical, though the times T1 and T2 are identical in the following.

As described above, in the direction designation operation mode, the virtual camera 54 can be directed in the direction having been designated by the game player in the past, even though the game player does not incline the right operation stick 42. This can save the time and labor of the game player attempting to direct the virtual camera 54 in a direction previously designated.

Also, in shifting from the normal operation mode to the direction designation operation mode, information describing the viewpoint position 56 and the sight line direction vector 58 at the time of shifting is stored in the main memory 26. Then, when the right operation stick 42 pressed in the axial direction is released, whereby the direction designation operation mode is shifted to the normal operation mode, the virtual camera 54 is set based on the information stored in the main memory 26. In this manner, the direction designation operation mode can smoothly shift to the normal operation mode in the game machine 10.

Figure 9:
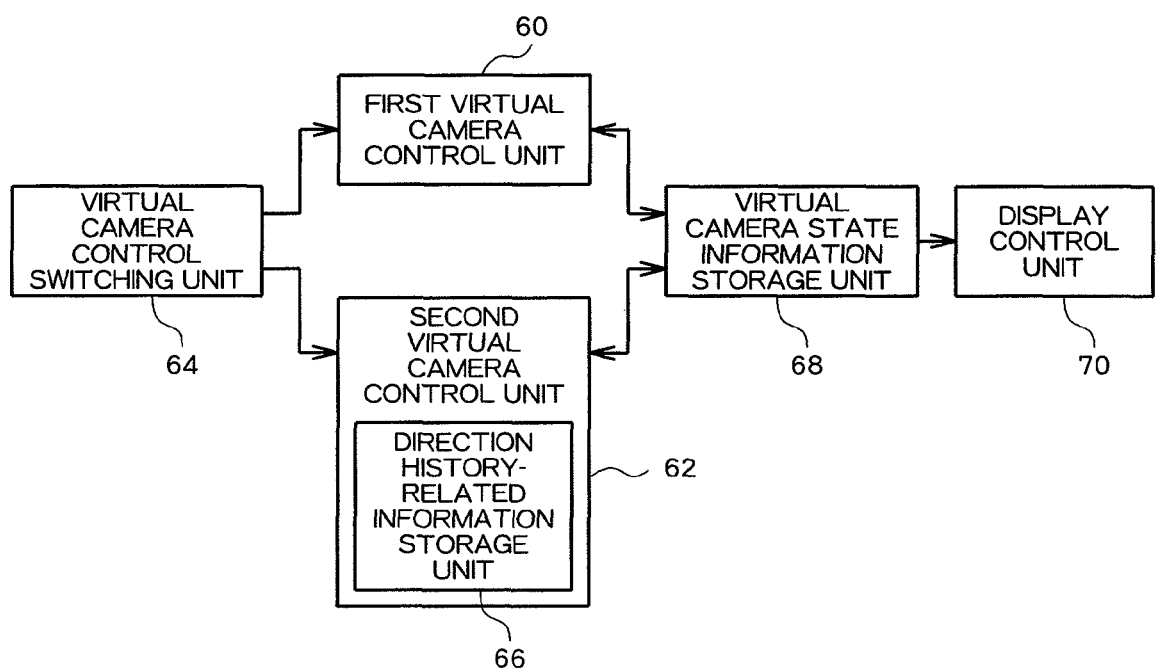
FIG. 9 is a function block diagram of a game machine according to this embodiment.

In the following, a functional structure of the game machine 10 will be described. FIG. 9 is a functional block diagram mainly showing the functions in connection with the present invention among those realized by the game machine 10. As shown, the game machine 10 comprises, in terms of functions, a first virtual camera control unit 60, a second virtual camera control unit 62, a virtual camera control switching unit 64, a virtual camera state information storage unit 68, and a display control unit 70. These functions are realized by the microprocessor 14 by executing a program read from the DVD-ROM 25.

[1. Virtual Camera State Information Storage Unit]

The virtual camera state information storage unit 68 is realized using the main memory 26 as a main component. The virtual camera state information storage unit 68 stores information describing the current position (the viewpoint position 56) and posture (the sight line direction vector 58) of the virtual camera 54, and additionally stores information about the up/down angle θyw which is set in the normal operation mode.

[2. Virtual Camera Control Switching Unit]

The virtual camera control switching unit 64 is realized using the microprocessor 14 as a main component. The virtual camera control switching unit 64 switches the states, through a predetermined switching operation, between the state in which the first virtual camera control unit 60 controls the virtual camera 54 and the state in which the second virtual camera control unit 62 controls the virtual camera 54. That is, the virtual camera control switching unit 64 switches the modes between the normal operation mode and the direction designation operation mode through a predetermined switching operation. The "predetermined switching operation" in this embodiment is an operation to press the right operation stick 42 in the axial direction, though the "predetermined switching operation" may be another operation, such as an operation to press the button 34R or the like, for example.

[3. First Virtual Camera Control Unit]

The first virtual camera control unit 60 is realized using the microprocessor 14 as a main component. The first virtual camera control unit 60 controls the virtual camera 54 in the normal operation mode. The first virtual camera control unit 60 determines the change direction in which the posture of the virtual camera 54 is changed, based on the state of operation of the controller 32, and changes the posture of the virtual camera 54 to the target posture in which the virtual camera 52 is directed in the direction displaced by a predetermined angle in that change direction relative to the current direction. In this embodiment, the first virtual camera control unit 60 determines the change direction in which the posture of the virtual camera 54 is changed, based on the state of operation of the right operation stick 42.

It should be noted that the first virtual camera control unit 60 stores, when the virtual camera control switching unit 64 switches state from the state in which the first virtual camera control unit 60 controls the virtual camera 54 (the normal operation mode) to the state in which the second virtual camera control unit 62 controls the virtual camera 54 (the direction designation operation mode), the information (the posture specification information) specifying the viewpoint position 56 and the sight line direction vector 58 at that time in the main memory 26. Meanwhile, when the virtual camera control switching unit 64 switches the state from the state in which the second virtual camera control unit 62 controls the virtual camera 54 (the direction designation operation mode) to the state in which the first virtual camera control unit 60 controls the virtual camera 54 (the normal operation mode), the first virtual camera control unit 60 sets the viewpoint position 56 and the sight line direction vector 58 based on the information stored in the main memory 26.

[4. Second Virtual Camera Control Unit]

The second virtual camera control unit 62 is realized using the microprocessor 14 as a main component. The second virtual camera control unit 62 controls the virtual camera 54 in the direction designation operation mode. The second virtual camera control unit 62 determines a direction in the virtual three dimensional space 50 based on the state of operation of the controller 32, and changes the posture of the virtual camera 54 to a target posture in which the virtual camera 54 is directed in that direction. In this embodiment, the first virtual camera control unit 60 determines the direction in the virtual three dimensional space 50 based on the state of operation of the right operation stick 42.

The second virtual camera control unit 62 stores determination criterion data describing the determination criterion of the posture data input from the right operation stick 42. In this embodiment, determination criterion data (base determination criterion data) describing the determination criterion, such as is shown in FIG. 5, is stored. Also, for each of the areas "1" to "8", determination criterion data in the case where the posture data input from the right operation stick 42 is contained in that area is stored. That is, the determination criterion data describing the determination criterion, such as is shown in FIG. 8, for example, is stored in each area "1" to "8".

When the posture data input from the right operation stick 42 is contained in the area "0", the second virtual camera control unit 62 obtains the direction corresponding to that posture data in the virtual three dimensional space 50 based on the base determination criterion data. Meanwhile, when the posture data input from the right operation stick 42 is contained in any of the areas "1" to "8", the second virtual camera control unit 62 obtains the direction corresponding to that posture data in the virtual three dimensional space 50 based on the determination criterion data corresponding to that area. Then, the second virtual camera control unit 62 changes the posture of the virtual camera 54 such that the virtual camera 54 is directed in the obtained direction.

It should be noted that it may be arranged such that the second virtual camera control unit 62 stores only the above-described base determination criterion data, and the determination criterion data corresponding to the respective areas "1" to "8" may be produced based on the above-described base determination criterion data.

[5. Direction History-Related Information Storage Unit]

The second virtual camera control unit 62 includes a direction history-related information storage unit 66. The direction history-related information storage unit 66 is realized using the main memory 26 as a main component. The direction history-related information storage unit 66 stores direction history-related information concerning the history of "the direction in the virtual three dimensional space 50, in which the virtual camera 54 is arranged to be directed by the second virtual camera control unit 62".

Figure 10:
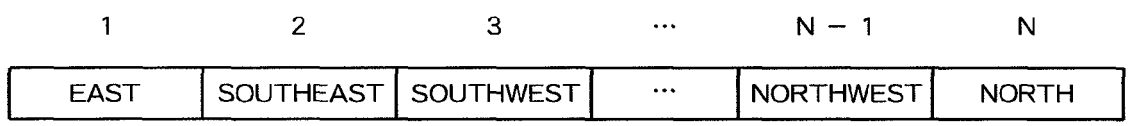
FIG. 10 is a diagram showing one example of direction history data.

In this embodiment, for example, direction history data (alignment data), such as is shown in FIG. 10, for example, is stored. The direction history data contains data about the directions having been designated the past N number of times by the game player by inclining the right operation stick 42 in the direction designation operation mode. It should be noted that the direction history data contains data about the directions having been designated by the game player, arranged in order beginning with the last designated one.

In response to a predetermined operation, the second virtual camera control unit 62 changes the posture of the virtual camera 54 to a target posture in which the virtual camera 52 is directed in the direction determined based on the direction history data in the virtual three dimensional space 50.

[6. Display Control Unit]

The display control unit 70 is realized using the microprocessor 14 and the image processing unit 16 as main components. The display control unit 70 sets the virtual camera 54 based on the content stored in the virtual camera state information storage unit 68, and displays on the monitor 18 a game screen image showing the picture obtained by viewing the virtual three dimensional space 50 from the virtual camera 54. In other words, the display control unit 70 displays on the monitor 18 a game screen image showing "a picture obtained by viewing the virtual three dimensional space 50 from the viewpoint position 56 stored in the virtual camera state information storage unit 68 in the direction indicated by the sight line direction vector 58 stored in the virtual camera state information storage unit 68".

In the following, a process to be carried out in the game machine 10 for every predetermined period of time (1/60 second in this embodiment) will be described. FIGS. 11 to 14 show flowcharts of a process according to the present invention among those carried out by the game machine 10 every predetermined period of time. The process shown in these drawings is realized by the microprocessor 14 by executing a program stored in the DVD-ROM 25.

Figure 11:
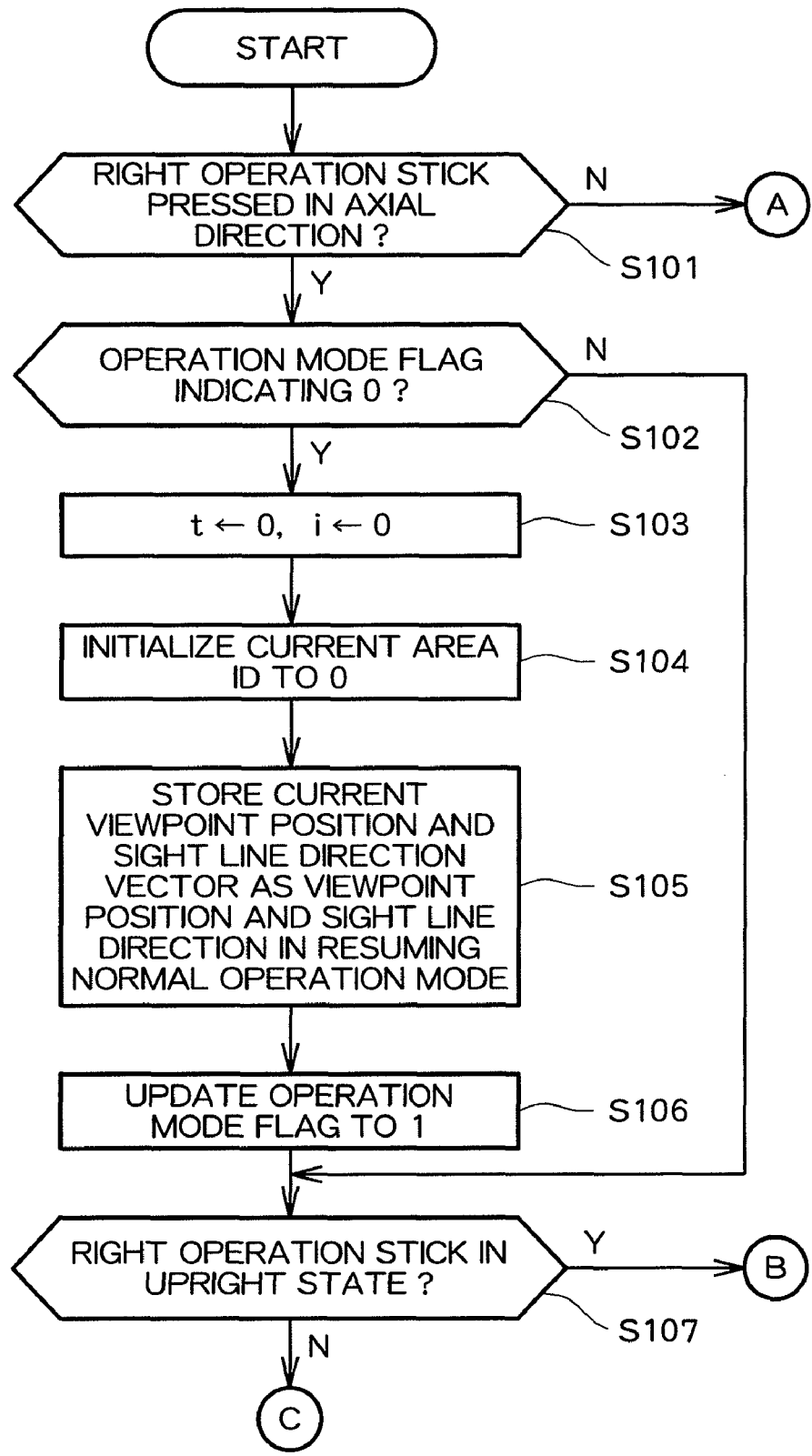
FIG. 11 is a flowchart of a process carried out by the game machine.
Figure 12:
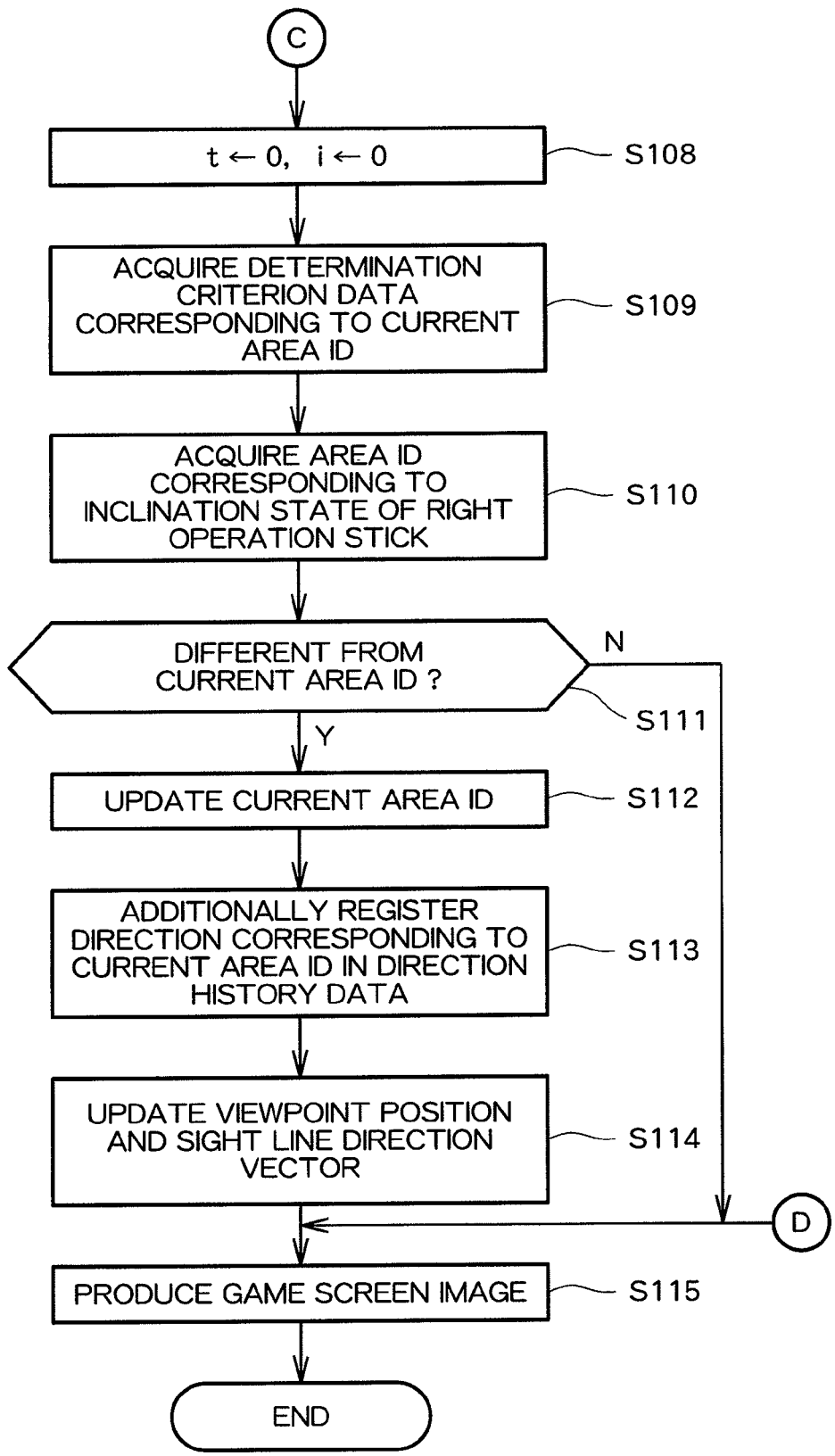
FIG. 12 is a flowchart of a process carried out by the game machine.
Figure 13:
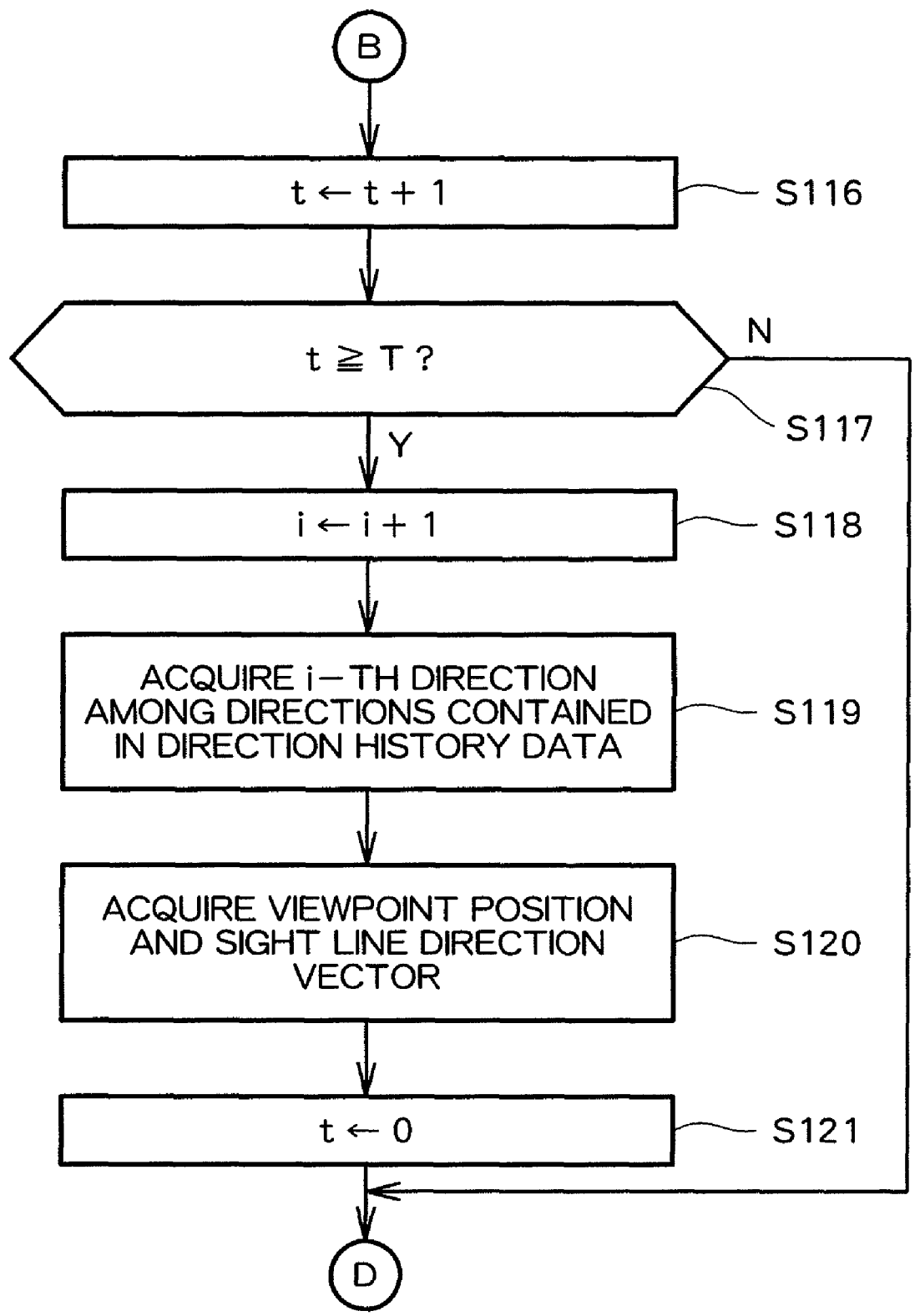
FIG. 13 is a flowchart of a process carried out by the game machine.
Figure 14:
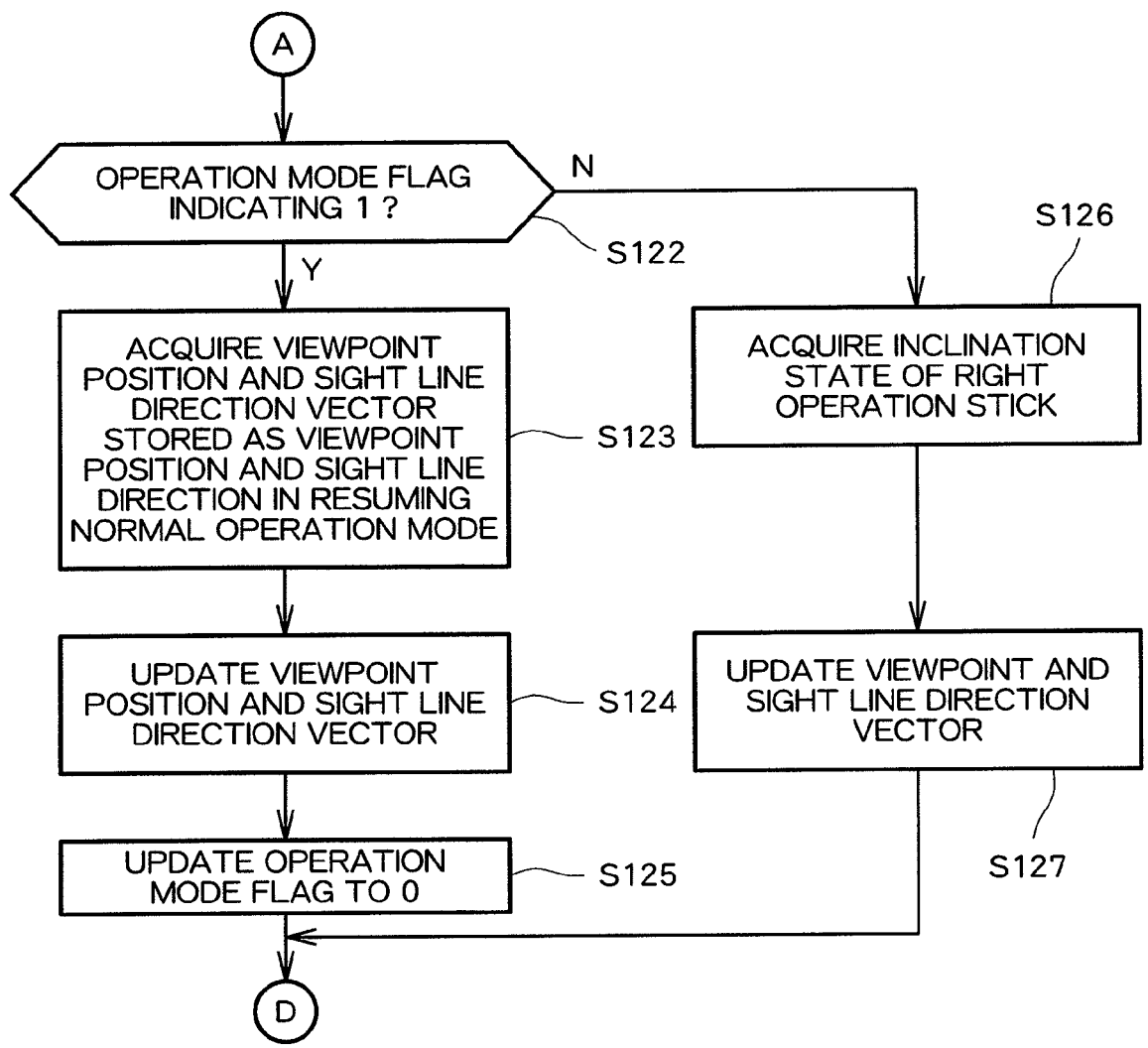
FIG. 14 is a flowchart of a process carried out by the game machine.

As shown in FIG. 11, the virtual camera control switching unit 64 determines whether or not the right operation stick 42 is pressed in the axial direction (S101). That is, whether or not an operational signal indicative of a pressing operation carried out relative to the right operation stick 42 is input from the controller 32 is determined. When it is determined that the right operation stick 42 is pressed in the axial direction, the process (S102 to S121) in the direction designation operation mode is carried out. Meanwhile, when it is determined that the right operation stick 42 is not pressed in the axial direction, the process (S122 to S127, S115) in the normal operation mode is carried out.

With the right operation stick 42 pressed, whether or not the operation mode flag indicates "0" is determined (S102). The operation mode flag is information describing whether the current operation mode of the virtual camera 54 is a normal operation mode or a direction designation operation mode, and stored in the main memory 26. The operation mode flag indicates either "0" or "1", with "0" for the normal operation mode and "1" for the direction designation operation mode.

With the right operation stick 42 pressed and the operation mode flag indicating "0", which concerns the state immediately after the right operation stick 42 is pressed, the process to initialize the direction designation operation mode (S103 to S106) is carried out.

That is, the variables t and i are initialized to "0" (S103). The variable t is used to measure the period of time with the right operation stick 42 kept upstanding in the direction designation operation mode (see 116 and S117). The variable i is a numeric value serving as a base in reading the direction from the direction history data (see FIG. 10) at S119 to be described later.

Thereafter, the current area ID is initialized to "0" (S104) The current area ID is an area ID of the area corresponding to the inclination state of the current right operation stick 42, and stored in the main memory 26. The current area ID takes any of the values "0" to "8" (see FIGS. 5 and 8).

Then, the viewpoint position 56 and the sight line direction vector 58 (the position and posture of the virtual camera 54) at that time are read from the virtual camera state information storage unit 68, and stored in the main memory 26 as a viewpoint position 56 and a sight line direction vector 58 for use in resuming the normal mode (S105). In addition, the operation mode flag is updated to "1" (S106).

With the process to initialize the direction designation operation mode completed (S103 to S106), or in response to the determination that the operation mode flag takes a value other than "0" (N at S102), the second virtual camera control unit 62 determines whether or not the right operation stick 42 is in the upstanding state (S107). That is, whether or not the posture state of the right operation stick 42 is the "0" state is determined.

When it is determined that the right operation stick 42 is not in the upstanding state, the second virtual camera control unit 62 initializes the variables t and i into "0" (S108).

Then, the second virtual camera control unit 62 obtains determination criterion data corresponding to the current area ID (S109). For example, with the current area ID being "0", determination criterion data describing the determination criterion, such as is shown in FIG. 5, is obtained. Also, when the current area ID being "7", for example, determination criterion data describing the determination criterion, such as is shown in FIG. 8, is obtained.

Thereafter, the second virtual camera control unit 62 obtains the area ID corresponding to the inclination state of the right operation stick 42 based on the determination criterion data obtained at S109 (S110). That is, the second virtual camera control unit 62 determines to which of the states "1" to "8" the inclination state of the right operation stick 42 belongs, based on the posture data of the right operation stick 42, output from the controller 32.

Then, when the area ID obtained at S110 is different from the current area ID (Y at S111), the second virtual camera control unit 62 changes the current area ID stored in the main memory 26 to the area ID obtained at S110 (S112). Also, the second virtual camera control unit 62 obtains the direction corresponding to the area ID obtained at S110 based on the data shown in FIG. 6, and additionally registers in the direction history data (see FIG. 10) (S113). It should be noted that the second virtual camera control unit 62 first erases the direction having been recorded earliest, when the N number of directions is already contained in the direction history data, and thereafter additionally registers the direction obtained at S110.

Thereafter, the second virtual camera control unit 62 updates the viewpoint position 56 and the sight line direction vector 58 (the position and posture of the virtual camera 54) such that the virtual camera 54 is directed in the direction corresponding to the current area ID (S114). Initially, the second virtual camera control unit 62 calculates the viewpoint position 56. Specifically, the second virtual camera control unit 62 calculates, as the viewpoint position 56, a position on the camera trajectory 59 in "a direction opposite from the direction corresponding to the current area ID" relative to the reference position 53. Thereafter, the second virtual camera control unit 62 calculates the sight line direction vector 58. Specifically, the second virtual camera control unit 62 calculates a direction vector (the reference sight line direction vector 57) extending from the calculated viewpoint position 56 to the reference position 53. Further, the second virtual camera control unit 62 reads the up/down angle Oyw from the virtual camera state information storage unit 68, calculates a vector, as a sight line direction vector 58, obtained by rotating the reference sight line direction vector 57 in the Yw axial direction by the up/down adjustment angle θy with the viewpoint position 56 calculated as described above as a center, and updates the viewpoint position 56 and the sight line direction vector 58, stored in the virtual camera state information storage unit 68, to the viewpoint position 56 and the sight line direction vector 58 calculated as described above.

It should be noted that, when it is determined that the right operation stick 42 is in the upstanding state (Y at S107), the second virtual camera control unit 62 increments the variable t (S116). Then, when the variable t is equal to or larger than T (Y at S117), the second virtual camera control unit 62 increments the variable i (S118), and obtains the i-th direction among the N number of directions contained in the direction history data (S119). Then, the second virtual camera control unit 62 updates the viewpoint position 56 and the sight line direction vector 58 (the position and posture of the virtual camera 54) such that the virtual camera 54 is directed in the direction obtained at S119 (S120). The process at this step is carried out similarly to the process at S114. Thereafter, the variable t is initialized to "0" (S121).

Also, when it is determined that the right operation stick 42 is not pressed in the axial direction (N at S101), whether or not the operation mode flag indicates "1" is determined (S122). With the right operation stick 42 not pressed in the axial direction and the operation mode flag indicating "1", which concerns the state immediately after the pressed right operation stick 42 is released, the process to initialize the normal operation mode (S123 to S125) is carried out.

That is, the first virtual camera control unit 60 obtains, from the main memory 26, the viewpoint position 56 and the sight line direction vector 58 (see 105) which are stored as the viewpoint position 56 and the sight line direction vector 58 for use in resuming the normal operation mode when shifting from the normal operation mode to the direction designation operation (S123). Then, the first virtual camera control unit 60 updates the viewpoint position 56 and the sight line direction vector 58, stored in the virtual camera state information storage unit 68, to the viewpoint position 56 and the sight line direction vector 58 obtained at S123 (S124). Thereafter, the operation mode flag is updated to "0" (S125).

Meanwhile, when the operation mode flag does not indicate "1" (N at S122), the first virtual camera control unit 60 obtains the inclination state of the right operation stick 42 based on the posture data of the right operation stick 42, output from the controller 32 (S126). Then, the first virtual camera control unit 60 updates the viewpoint position 56 and the sight line direction vector 58 (the position and posture of the virtual camera 54) based on the inclination state of the right operation stick 42 (S127).

For example, when the right operation stick 42 is inclined rightward (the X axis positive direction in FIG. 2(a)), the first virtual camera control unit 60 reads the current viewpoint position 56 from the virtual camera state information storage unit 68. Then, the first virtual camera control unit 60 calculates as a new viewpoint position 56 "a position on the camera trajectory 59, having moved from the current viewpoint position 56 in the virtual camera 54's right direction by a predetermined distance (a movement distance of the virtual camera 54 for every 1/60 seconds)". Thereafter, the first virtual camera control unit 60 calculates the sight line direction vector 58 in the new viewpoint position 56. Initially, the first virtual camera control unit 60 calculates a direction vector (the reference sight line direction vector 57) extending from the new viewpoint position 56 to the reference position 53. Then, the first virtual camera control unit 60 reads the up/down angle θyw stored in the virtual camera state information storage unit 68, and calculates, as a new sight line direction vector 58, a vector formed by rotating the reference sight line direction vector 57 in the Yw axial direction by the up/down angle θyw with the new viewpoint position 56 as a center. The first virtual camera control unit 60 updates the viewpoint position 56 and the sight line direction vector 58, stored in the virtual camera state information storage unit 68, to the viewpoint position 56 and the sight line direction vector 58 calculated as described above. It should be noted that a similar process is carried out when the right operation stick 42 is included leftward (the X axis negative direction in FIG. 2(a)).

Also, when the right operation stick 42 is inclined upward (the Y axis positive direction in FIG. 2(a)), for example, the first virtual camera control unit 60 reads the current up/down angle θyw of the virtual camera 54 from the virtual camera state information storage unit 68, and updates the up/down angle θyw stored in the virtual camera state information storage unit 68 to the θyw+Δθyw. Further, the first virtual camera control unit 60 reads the current viewpoint position 56 and sight line direction vector 58 of the virtual camera 54 from the virtual camera state information storage unit 68, and calculates, as a new sight line direction vector 58, a vector formed by rotating the current sight line direction vector 58 in the Yw axial direction by the up/down angle Δθyw with the viewpoint position 56 as a center. Then, the first virtual camera control unit 60 updates the sight line direction vector 58, stored in the virtual camera state information storage unit 68, to the newly calculated sight line direction vector 58. It should be noted that Δθyw indicates a predetermined increase/decrease angle for every 1/60 second. A similar process is carried out also when the right operation stick 42 is inclined downward (the Y axis negative direction in FIG. 2(a)).

The display control unit 70 reads the viewpoint position 56 and the sight line direction vector 58 from the virtual camera state information storage unit 68, and renders a game screen image showing a picture obtained by viewing the virtual three dimensional space 50 from the viewpoint position 56 in the direction indicated by the sight line direction vector 58, in the VRAM (S115). The game screen image rendered in the VRAM is displayed on the monitor 18 at a predetermined timing.

As described above, according to the game machine 10, the game player, who loses the idea about their desired direction in the virtual three dimensional space 50 or the like, can direct the virtual camera 54 in their desired direction by inclining the right operation stick 42 in the direction corresponding to the desired direction. That is, the game player can direct the virtual camera 54 in their desired direction in the virtual three dimensional space 50 through a relatively simple operation.

It should be noted that the present invention is not limited to the above-described embodiment.

For example, the direction history data (see FIG. 10) may contain the current up/down angle θyw at that time together with the direction. Then, in the process at S119 and S120, the second virtual camera control unit 62 obtains the up/down angle θyw together with the direction, and updates the viewpoint position 56 and the sight line direction vector 58 based thereon.

Also, for example, it may be arranged such that, in the direction designation operation mode, the virtual camera 54 is directed in the direction determined based on the direction history data as the most frequently designated by the game player, when the right operation stick 42 remains in the upstanding state for a predetermined period of time. Also, when the right operation stick 42 remains in the upstanding state for another predetermined period of time, the virtual camera 54 may be directed in the direction determined based on the direction history data as second most frequently designated by the game player. As described above, every time the right operation stick 42 continues to remain in the upstanding state for a predetermined period of time, the virtual camera 54 is sequentially directed in different directions, beginning with the direction determined, based on the direction history data, as that most frequently designated by the game player.

Also, for example, the direction history-related information stored in the direction history-related information storage unit 66 may include a direction and a total period of time with the virtual camera 54 remaining directed in that direction in the direction designation operation mode. Then, when the right operation stick 42 remains in the upstanding state for a predetermined period of time in the direction designation operation mode, the virtual camera 54 may be directed in the direction related to the longest total period of time. Also, when the right operation stick 42 continues, from that state, to remain in the upstanding state for another predetermined period of time, the virtual camera 54 may be directed in the direction related to the second longest total period of time. As described above, every time the right operation stick 42 continues to remain in the upstanding state for a predetermined period of time, the virtual camera 54 may be sequentially directed in different directions, beginning with the direction related to the longest total period of time.

The present invention can be applied, for example, to a so-called first person viewpoint game.

Figure 15:
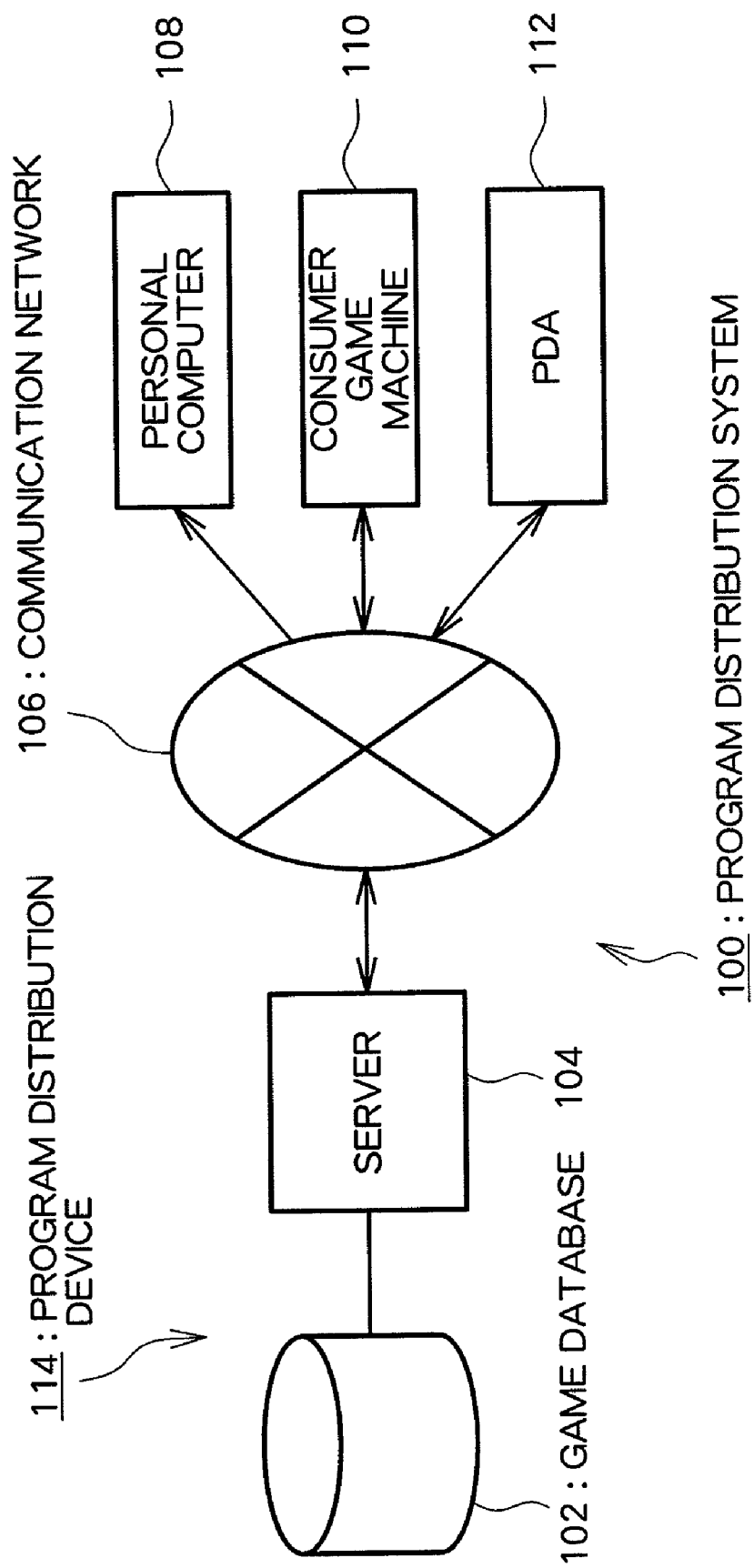
FIG. 15 is a diagram showing a whole structure of a program distribution system according to another embodiment of the present invention.

Although it is described in the above that a program is supplied from a DVD-ROM 25, or an information storage medium, to the consumer game machine 11, the program may alternatively be distributed via a network program to home or the like. FIG. 15 is a diagram showing a whole structure of a program distribution system using a communication network. A program distribution method according to the present invention will be described with reference to FIG. 15. As shown in FIG. 15, the program distribution system 100 comprises a game database 102, a server 104, a communication network 106, a personal computer 108, a consumer game machine 110, and a PDA (a personal digital assistance) 112. The game database 102 and the server 104 together constitute a program distribution device 114. The communication network 106 comprises, for example, the Internet and/or a cable television network. In this system, the game database 102 (an information storage medium) stores a program identical to the content recorded in the DVD-ROM 25. Then, when the user requests distribution of the game, using the personal computer 108, the consumer game machine 110, the PDA 112, or the like, the request is transmitted via the communication network 106 to the server 104. Then, the server 104, in response to the game distribution request, reads a program from the game database 102, and sends to the entity, such as the personal computer 108, the consumer game machine 110, the PDA 112, or the like, having made the game distribution request. Here, although it is described in the above that game distribution is carried out in response to a game distribution request, the server 104 may send a game unidirectionally. Also, it is not necessary for all programs necessary to realize the game to be distributed all at once (collective distribution), and only game components necessary according to a particular aspect of the game may be distributed (divided distribution). As described above, game distribution via the communication network 106 makes it possible for the user wishing to obtain a program to readily obtain the program.

The invention claimed is:

1. A game machine for showing a picture obtained by viewing a virtual three dimensional space from a virtual camera placed in the virtual three dimensional space, the game machine comprising:
a processor and a memory,
first virtual camera control means for determining by the processor a change direction in which a posture of the virtual camera is changed, based on a state of operation of operation means, and changing the posture of the virtual camera such that the virtual camera is directed in a direction displaced from a current direction in the change direction by a predetermined angle;
second virtual camera control means for determining by the processor a direction in the virtual three dimensional space based on the state of operation of the operation means, and changing the posture of the virtual camera such that the virtual camera is directed in the determined direction;
virtual camera control switching means for, by the processor, switching states, according to a predetermined switching operation, between a state in which the first virtual camera control means controls the virtual camera and a state in which the second virtual camera control means controls the virtual camera; and
operation value acquisition means for acquiring, by the processor, an operation value in accordance with the state of operation of the operation means, wherein
the second virtual camera control means includes
means for acquiring content stored in means for storing any of a plurality of directions in the virtual three dimensional space so as to correspond to a respective range of the plurality of operation value ranges which do not overlap; and
determination means for determining whether or not the operation value acquired by the operation value acquisition means is contained in any of the plurality of operation value ranges, and changes the posture of the virtual camera, when it is determined that the operation value acquired by the operation value acquisition means is contained in any of the plurality of operation value ranges, such that the virtual camera is directed in a direction corresponding to that operation value range, and
the determination means changes the plurality of operation value ranges, when it is determined that the operation value acquired by the operation value acquisition means is contained in any of the plurality of operation value ranges, such that that operation value range is expanded and other operation value ranges are narrowed, and determines whether or not the operation value acquired by the operation value acquisition means is contained in any of the plurality of operation value ranges, based on the plurality of operation value ranges after change.

2. The game machine according to claim 1, wherein
the first virtual camera control means includes means for storing posture specification information in storage means when the virtual camera control switching means switches the state in which the first virtual camera control means controls the virtual camera to the state in which the second virtual camera control means controls the virtual camera, the posture specification information specifying the posture of the virtual camera at that time; and
means for setting the posture of the virtual camera based on the posture specification information stored in the storage means when the virtual camera control switching means switches the state in which the second virtual camera control means controls the virtual camera to the state in which the first virtual camera control means controls the virtual camera.

3. The game machine according to claim 1, wherein
the second virtual camera control means includes means for storing the direction history-related information comprising a history of directions in which the virtual camera has been set by the second virtual camera control means; and
means for determining, based on a previously designated direction the direction history-related information, the direction in the virtual three dimensional space, in response to the predetermined operation, and changing the posture of the virtual camera such that the virtual camera is directed in that direction.

4. The game machine according to claim 1, wherein
the first virtual camera control means determines a change direction in which a posture of the virtual camera is changed, based on an inclination direction of an operation stick included in the operation means, and changes the posture of the virtual camera such that the virtual camera is directed in a direction displaced from a current direction in the change direction by a predetermined angle,
the second virtual camera control means determines a direction in the virtual three dimensional space based on the inclination direction of the operation stick, and changes the posture of the virtual camera such that the virtual camera is directed in the determined direction, and
the predetermined switching operation is an operation to press the operation stick in an axial direction.

5. A control method of a game machine for showing a picture obtained by viewing a virtual three dimensional space from a virtual camera placed in the virtual three dimensional space, comprising:
a first virtual camera control step of determining by a processor a change direction in which a posture of the virtual camera is changed, based on a state of operation of operation means, and changing the posture of the virtual camera such that the virtual camera is directed in a direction displaced from a current direction in the change direction by a predetermined angle;
a second virtual camera control step of determining by the processor a direction in the virtual three dimensional space based on the state of operation of the operation means, and changing the posture of the virtual camera such that the virtual camera is directed in the determined direction;

a virtual camera control switching step of switching states by the processor, according to a predetermined switching operation, between a state in which the virtual camera is controlled at the first virtual camera control step and a state in which the virtual camera is controlled at the second virtual camera control step; and an operation value acquisition step for acquiring, by the processor, an operation value in accordance with the state of operation of the operation means, wherein the second virtual camera control step includes a step of acquiring content stored in means for storing any of a plurality of directions in the virtual three dimensional space so as to correspond to a respective range of the plurality of operation value ranges which do not overlap; and a step of determining whether or not the operation value acquired by the operation value acquisition step is contained in any of the plurality of operation value ranges, and changes the posture of the virtual camera, when it is determined that the operation value acquired by the operation value acquisition step is contained in any of the plurality of operation value ranges, such that the virtual camera is directed in a direction corresponding to that operation value range, and the step of determining changes the plurality of operation value ranges, when it is determined that the operation value acquired by the operation value acquisition is contained in any of the plurality of operation value ranges, such that that operation value range is expanded and other operation value ranges are narrowed, and determines whether or not the operation value acquired by the operation value acquisition step is contained in any of the plurality of operation value ranges, based on the plurality of operation value ranges after change.

6. A non-transitory computer readable information storage medium storing a program for causing a computer to function as a game machine for showing a picture obtained by viewing a virtual three dimensional space from a virtual camera placed in the virtual three dimensional space, the computer functioning as:

first virtual camera control means for determining a change direction in which a posture of the virtual camera is changed, based on a state of operation of operation means, and changing the posture of the virtual camera such that the virtual camera is directed in a direction displaced from a current direction in the change direction by a predetermined angle;

second virtual camera control means for determining a direction in the virtual three dimensional space based on the state of operation of the operation means, and changing the posture of the virtual camera such that the virtual camera is directed in the determined direction;

virtual camera control switching means for switching states, according to a predetermined switching operation, between a state in which the first virtual camera control means controls the virtual camera and a state in which the second virtual camera control means controls the virtual camera; and operation value acquisition means for acquiring, by the processor, an operation value in accordance with the state of operation of the operation means, wherein the second virtual camera control means includes means for acquiring content stored in means for storing any of a plurality of directions in the virtual three dimensional space so as to correspond to a respective range of the plurality of operation value ranges which do not overlap; and determination means for determining whether or not the operation value acquired by the operation value acquisition means is contained in any of the plurality of operation value ranges, and changes the posture of the virtual camera, when it is determined that the operation value acquired by the operation value acquisition means is contained in any of the plurality of operation value ranges, such that the virtual camera is directed in a direction corresponding to that operation value range, and the determination means changes the plurality of operation value ranges, when it is determined that the operation value acquired by the operation value acquisition means is contained in any of the plurality of operation value ranges, such that that operation value range is expanded and other operation value ranges are narrowed, and determines whether or not the operation value acquired by the operation value acquisition means is contained in any of the plurality of operation value ranges, based on the plurality of operation value ranges after change.

7. A game machine for showing a picture obtained by viewing a virtual three dimensional space from a virtual camera placed in the virtual three dimensional space, the game machine comprising:

a processor and a memory, first virtual camera control means for determining by the processor a change direction in which a posture of the virtual camera is changed, based on a state of operation of operation means, and changing the posture of the virtual camera such that the virtual camera is directed in a direction displaced from a current direction in the change direction by a predetermined angle;

second virtual camera control means for determining by the processor a direction in the virtual three dimensional space based on the state of operation of the operation means, and changing the posture of the virtual camera such that the virtual camera is directed in the determined direction;

virtual camera control switching means for, by the processor, switching states, according to a predetermined switching operation, between a state in which the first virtual camera control means controls the virtual camera and a state in which the second virtual camera control means controls the virtual camera;

operation value acquisition means for acquiring, by the processor, an operation value in accordance with the state of operation of the operation means; and means for determining, by the processor, based on direction history-related information, a direction to which the virtual camera is set to direct most frequently or for the longest total period of time by the second virtual camera control means, in response to a predetermined operation, and changing the posture of the virtual camera such that the virtual camera is directed in the determined direction, wherein the direction history-related information comprises a history of directions in which the virtual camera has been set by the second virtual camera control means.

8. A control method of a game machine for showing a picture obtained by viewing a virtual three dimensional space from a virtual camera placed in the virtual three dimensional space, comprising:
- a first virtual camera control step of determining by a processor a change direction in which a posture of the virtual camera is changed, based on a state of operation of operation means, and changing the posture of the virtual camera such that the virtual camera is directed in a direction displaced from a current direction in the change direction by a predetermined angle;
- a second virtual camera control step of determining by the processor a direction in the virtual three dimensional space based on the state of operation of the operation means, and changing the posture of the virtual camera such that the virtual camera is directed in the determined direction;
- a virtual camera control switching step of switching by the processor states, according to a predetermined switching operation, between a state in which the virtual camera is controlled at the first virtual camera control step and a state in which the virtual camera is controlled at the second virtual camera control step;
- an operation value acquisition step for acquiring, by the processor, an operation value in accordance with the state of operation of the operation means; and
- a step of determining by the processor, based on direction history-related information, a direction to which the virtual camera is set to direct most frequently or for the longest total period of time by the second virtual camera control step, in response to a predetermined operation, and changing the posture of the virtual camera such that the virtual camera is directed in the determined direction, wherein the direction history-related information comprises a history of directions in which the virtual camera has been set by the second virtual camera control step.

9. A non-transitory computer readable information storage medium storing a program for causing a computer to function as a game machine for showing a picture obtained by viewing a virtual three dimensional space from a virtual camera placed in the virtual three dimensional space, the computer functioning as:
- first virtual camera control means for determining a change direction in which a posture of the virtual camera is changed, based on a state of operation of operation means, and changing the posture of the virtual camera such that the virtual camera is directed in a direction displaced from a current direction in the change direction by a predetermined angle;
- second virtual camera control means for determining a direction in the virtual three dimensional space based on the state of operation of the operation means, and changing the posture of the virtual camera such that the virtual camera is directed in the determined direction
- virtual camera control switching means for switching states, according to a predetermined switching operation, between a state in which the first virtual camera control means controls the virtual camera and a state in which the second virtual camera control means controls the virtual camera;
- operation value acquisition means for acquiring, by the processor, an operation value in accordance with the state of operation of the operation means; and
- means for determining, based on direction history-related information, a direction to which the virtual camera is set to direct most frequently or for the longest total period of time by the second virtual camera control means, in response to a predetermined operation, and changing the posture of the virtual camera such that the virtual camera is directed in the determined direction, wherein the direction history-related information comprises a history of directions in which the virtual camera has been set by the second virtual camera control means.

* * * * *